Figure 1:
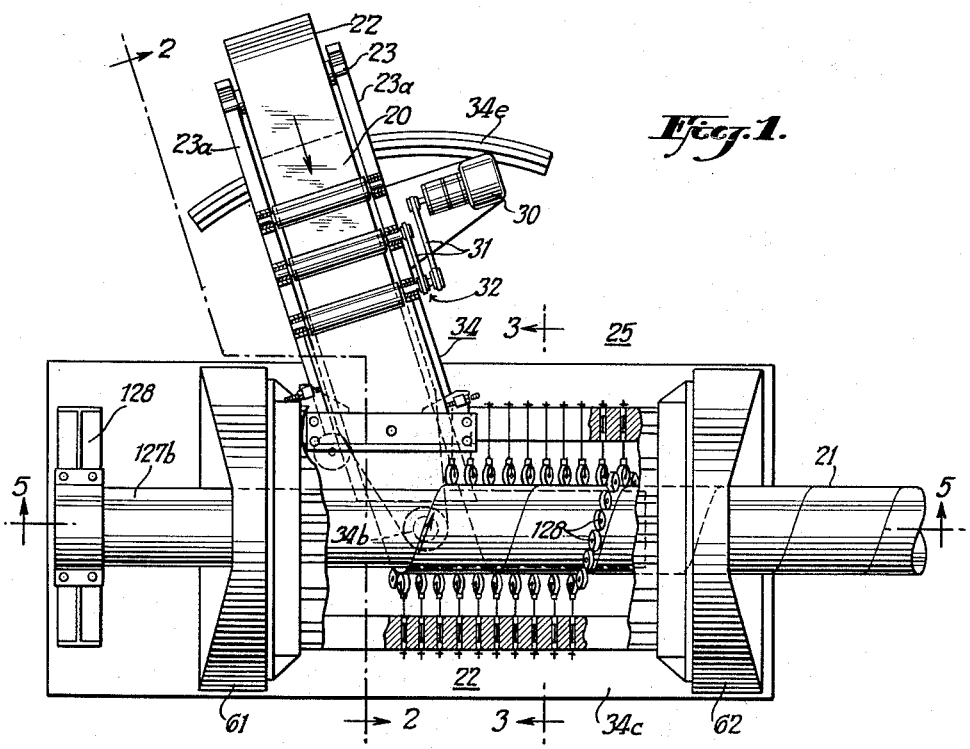

Oct. 8, 1963 R. J. NICOLAISEN 3,106,177
TUBE FORMING METHOD AND APPARATUS
Filed Jan. 2, 1959 9 Sheets-Sheet 1

INVENTOR.
REIDAR J. NICOLAISEN.
BY
Ward, Neal, Haselton, Orme & McElhannon
ATTORNEYS.

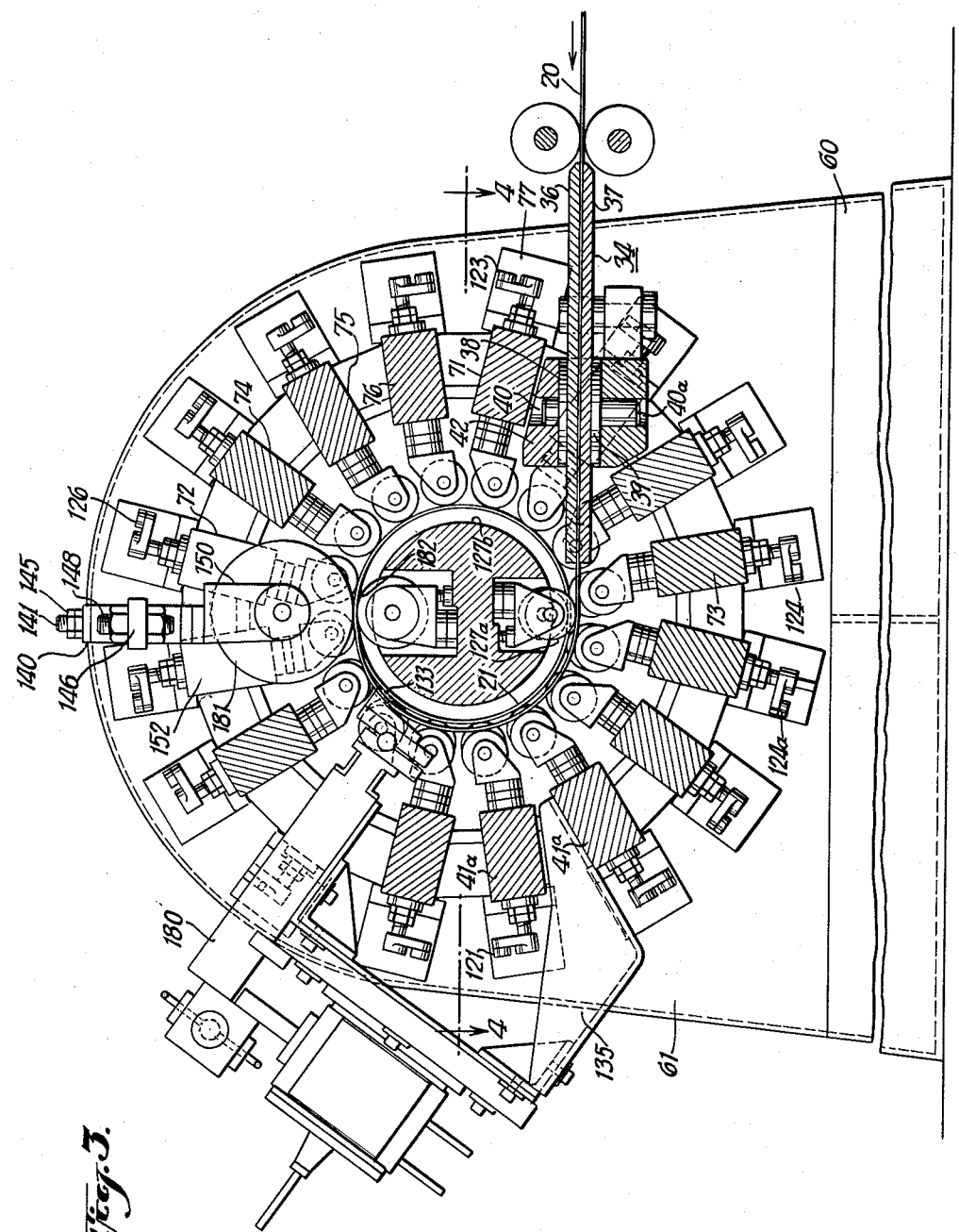

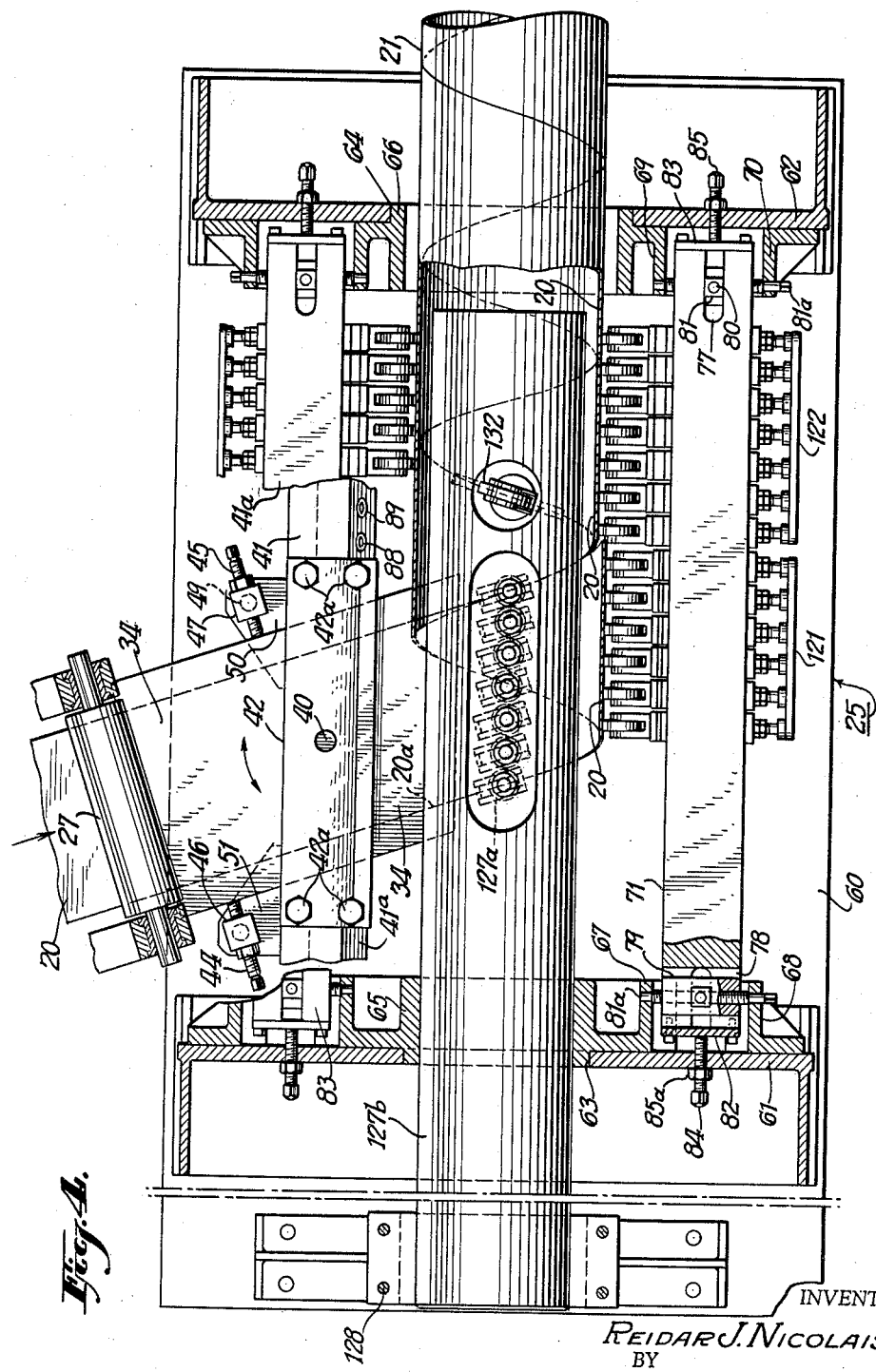

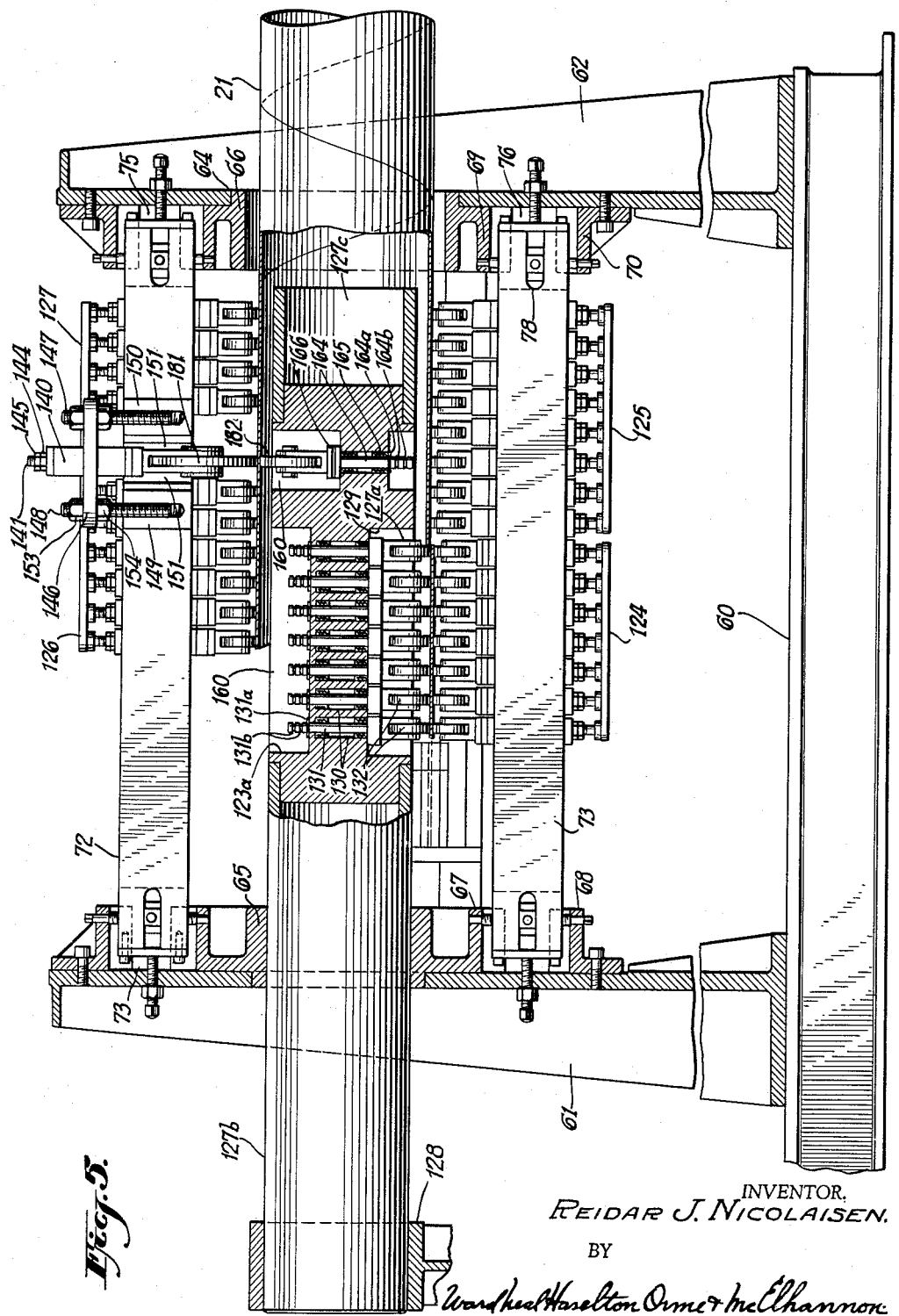

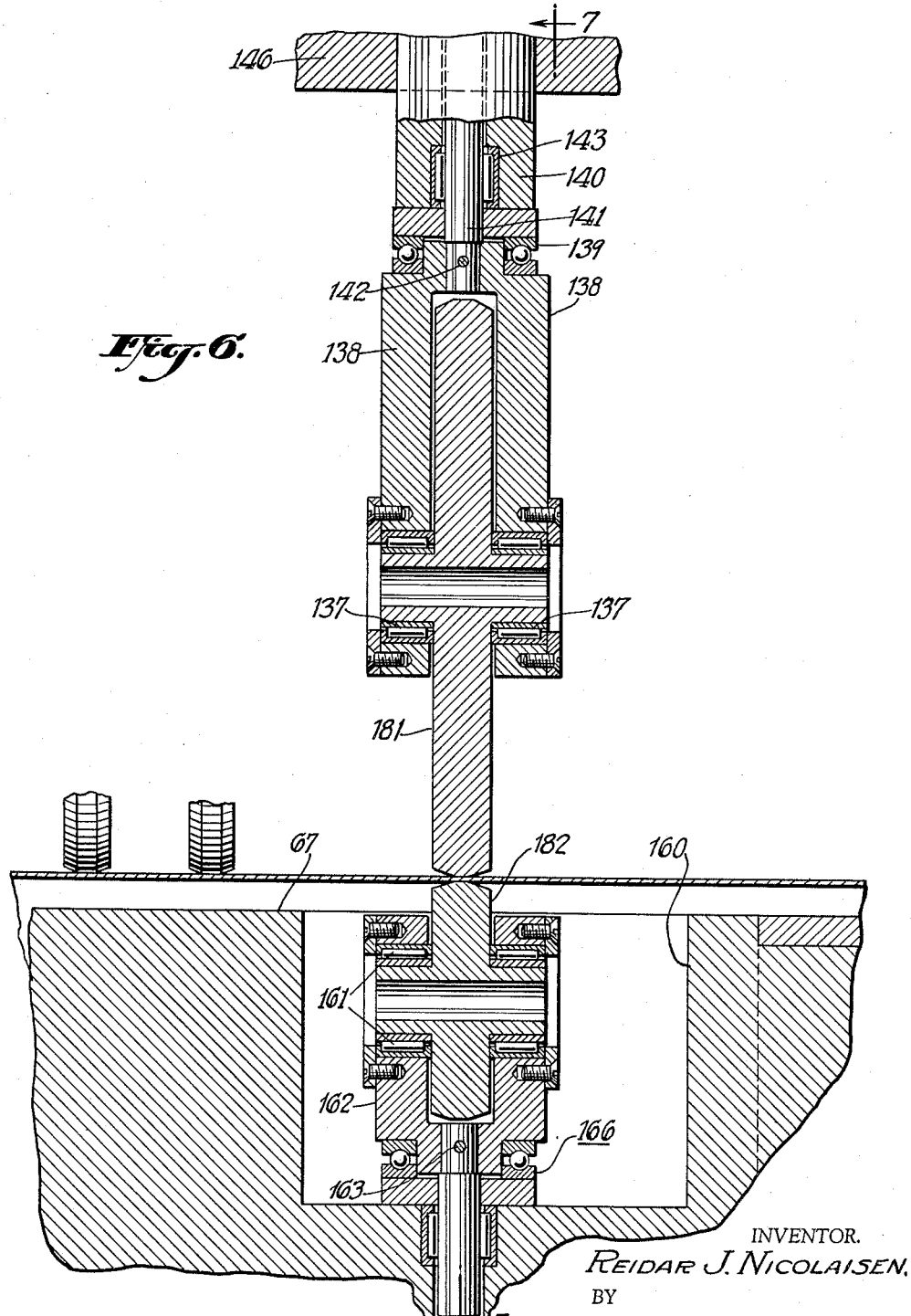

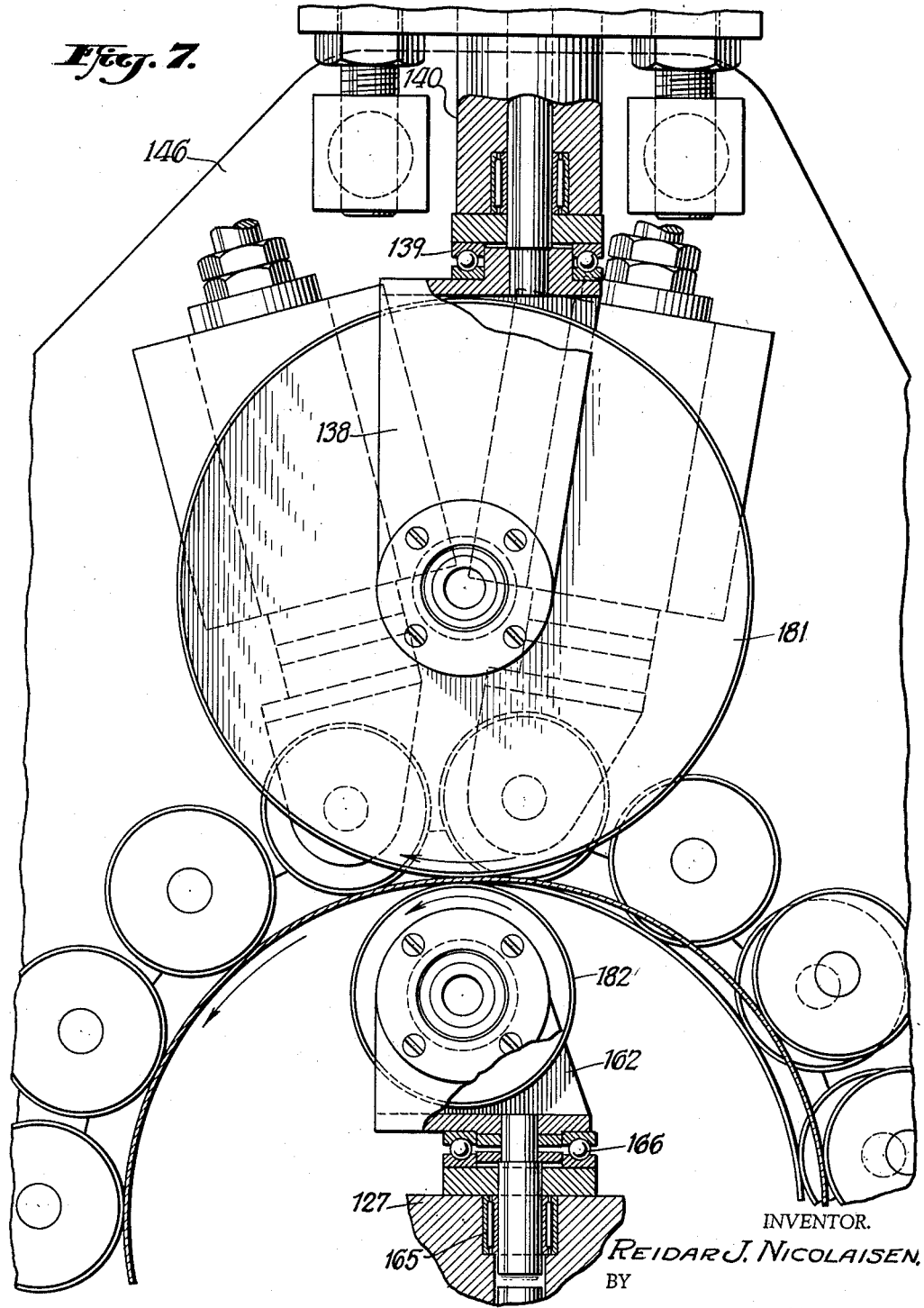

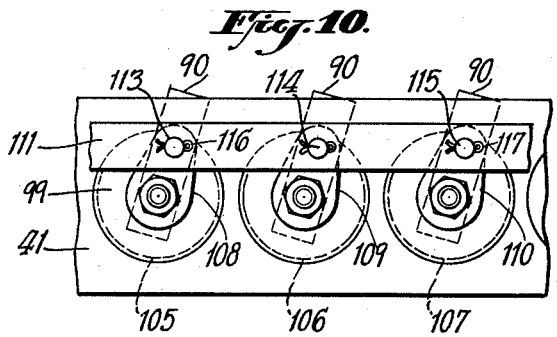
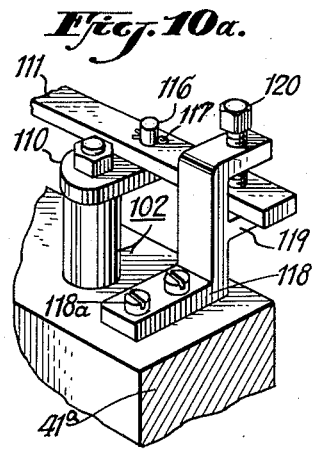
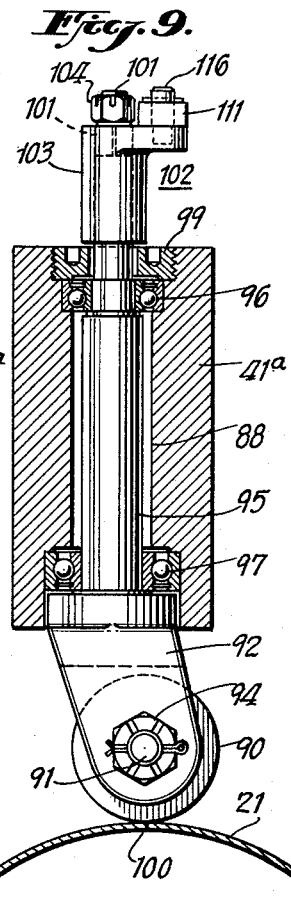
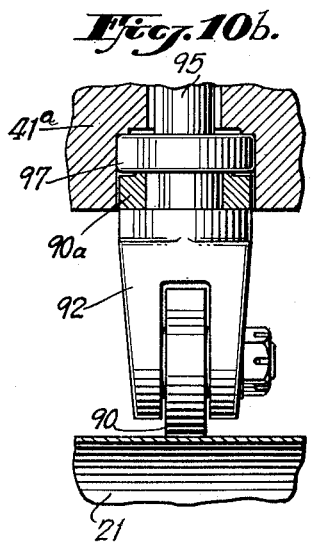
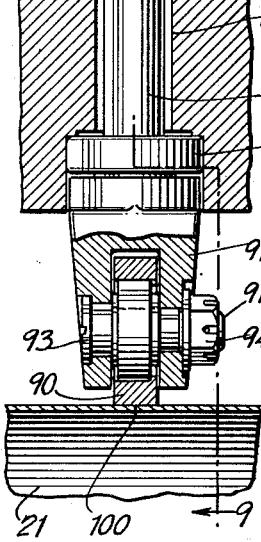

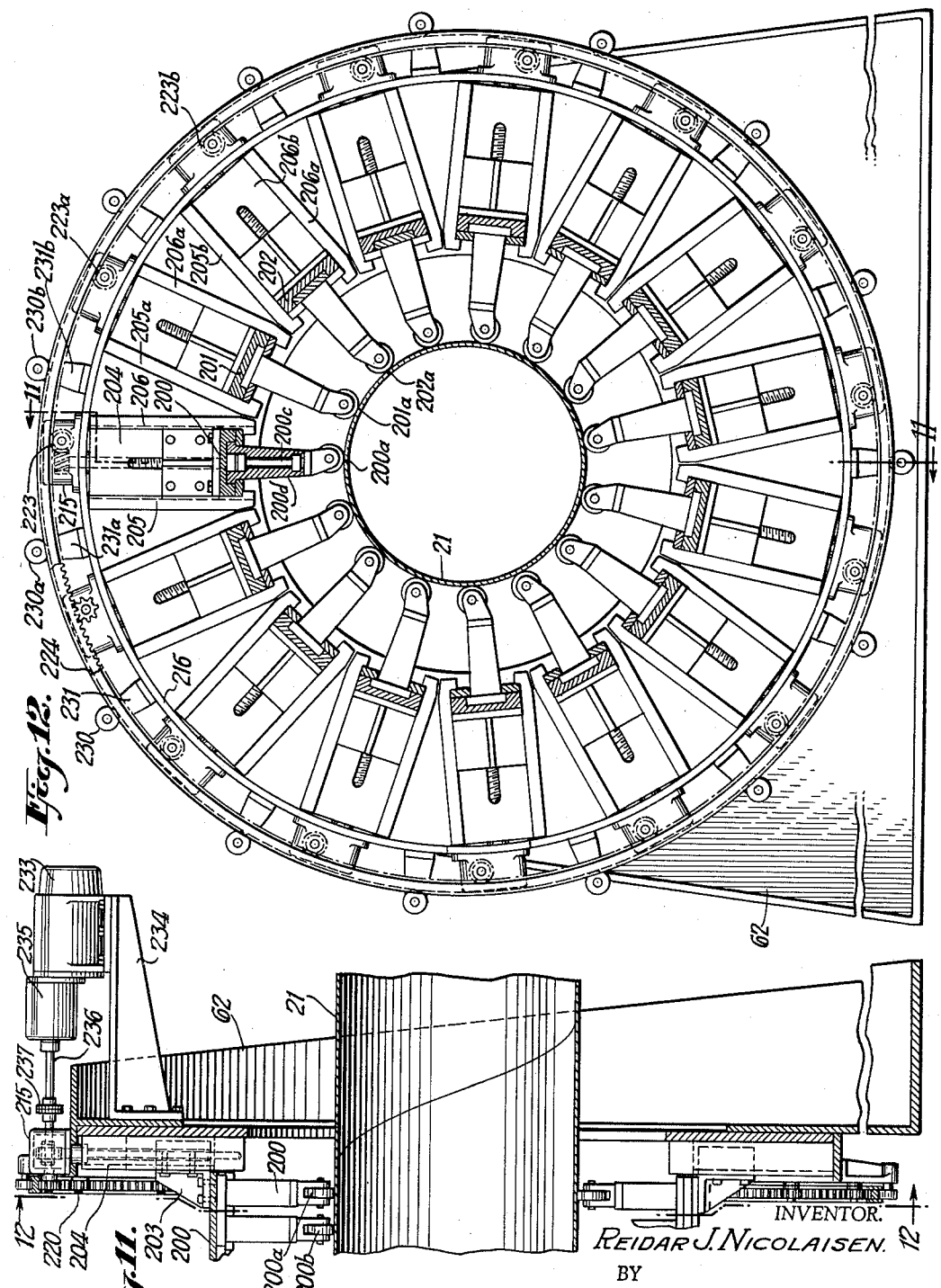

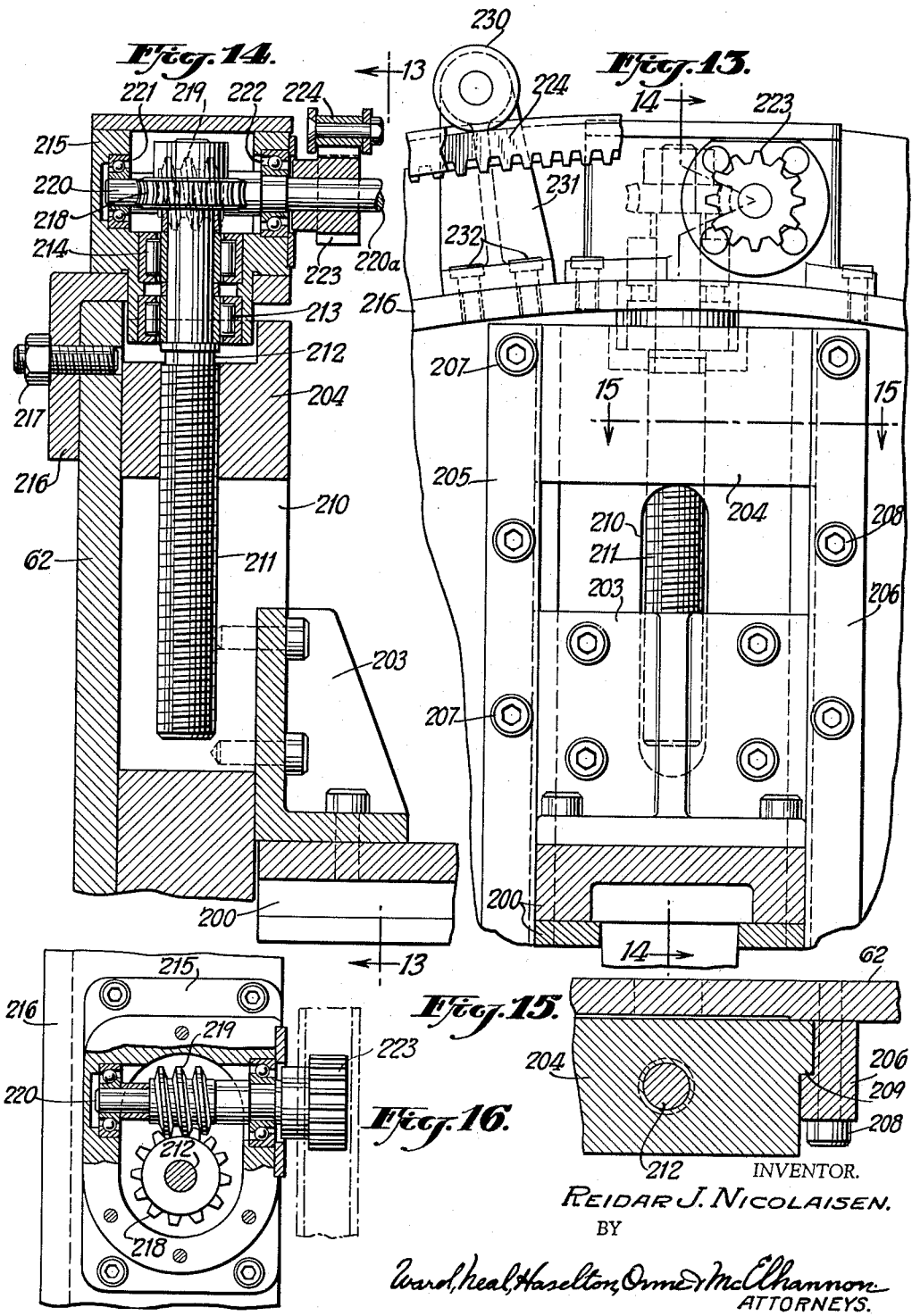

United States Patent Office 3,106,177
Patented Oct. 8, 1963

3,106,177
TUBE FORMING METHOD AND APPARATUS
Reidar J. Nicolaisen, New York, N.Y., assignor to Raymond International Inc., New York, N.Y., a corporation of New Jersey
Filed Jan. 2, 1959, Ser. No. 784,772
8 Claims. (Cl. 113—35)

This invention pertains to the production of tubing, especially of relatively large diameter, from flexible strip material, and more particularly to methods and apparatus for continuously winding such strip material into tubular configuration while uniting contiguous edges along the helical seam, thus to form the completed tubing.

The invention is especially applicable to the manufacture of such tubing from metal strip, such as steel strip, the contiguous edges of which are joined, as by a locking type of seam or by welding.

The invention is also applicable to the production of such tubing from other materials which are relatively stiff, yet sufficiently flexible in sheet or strip form for helically coiling into tubing, especially in relatively large diameters, such as strip made of the various thermoplastic resins, such as the vinyl, vinylidene, polyethylene, cellulose acetate, etc. resins, or from laminated plastic strip material impregnated with a thermosetting resin, such as phenol-formaldehyde, etc. Contiguous edges of such tubing can be united in any of the conventional ways, as by heat sealing, for example, by feeding between heated pressure or squeeze rolls.

One object of the invention is to provide a novel method and apparatus for rapidly and inexpensively forming such tubing in lengths and diameters suitable for structural applications, such as shells for pilings or the underpinnings of buildings, conduits, containers, etc.

A further object is to provide a novel apparatus for forming such tubing by means of a series of forming rolls which are aligned with the helical path of travel of the strip, whereby a true rolling action obtains between these rolls and strip during the forming operation.

A further object is to provide an apparatus of the character aforesaid wherein the forming rolls may be arranged either automatically to align themselves with the helical path of travel of the strip, or alternatively, may be adjustably set in such position of alignment.

A still further object is to provide an apparatus of the character aforesaid having cooperating mash or pressure rolls automatically or adjustably aligned, as aforesaid, with the helical seam between contiguous edges of the so formed tubing, for continuously mash welding said contiguous edges of metal tubing, or for heat sealing contiguous edges of plastic tubing as it is formed.

Still other and further objects and novel features of the invention will become apparent from the detailed description thereof set forth below.

One form of apparatus and method for forming such tubing is described in a co-pending application Serial No. 530,366, filed August 24, 1955, jointly by Edward A. Smith and myself.

In accordance with the invention described in said co-pending application, the strip is fed continuously from a reel thereof thence between driven feed rolls and thence into a tube-forming apparatus, at an oblique angle to the axis of the tubing being formed. The tube-forming apparatus or "tube former" comprises a series of relatively wide faced, cylindrical rolls, which are angularly spaced about the axis of the tubing being formed, with their roll faces disposed substantially parallel to the tubing axis, and within the envelope of which the advancing strip is continuously bent and curled helically into the tubing and welded along the seam, while at the same time the thus continuously formed tubing is advanced axially past the forming rolls by additional rolls engaging the edge of the strip as it enters the forming rolls. Co-acting with the outer forming rolls are inner, wide faced, cylindrical rolls, which are rotatively mounted on a stationary mandrel which projects into the tubing interior from a supporting stand mounted adjacent the point of entry of the advancing strip into the tube former.

This form of apparatus while embodying many advantageous features over theretofore known means of forming such tubing, as pointed out in said application, nevertheless, inherently embodies the objectionable aspect, that the tubing as it is formed and axially advanced, must slide axially along the faces of the inner and outer forming rolls, since the helical path traversed by the strip at any point, has a component parallel to the roll faces and a component at right angles thereto, the latter providing a true rolling action with respect to the forming rolls, while the former component has a sliding action axially with respect thereto. This axial displacement of the tubing in sliding engagement along the faces of the forming rolls, is objectionable in various respects in that it tends to score the surfaces of the tubing, and also necessitates the application of additional power for overcoming the frictional retarding forces set up between the forming rolls and the tubing, and furthermore, requires the application of additional force by the edge rolls for advancing the tubing axially past the forming rolls.

These objectionable features are completely eliminated by the present invention wherein the relatively wide faced rolls mounted on fixed axes, as in said former application, are replaced by a series of relatively narrow faced, caster roll assemblies, each comprising a roll journaled to a bearing member integral with a spindle perpendicular to the roll axis and offset with respect thereto. A series of such caster roll assemblies are circularly disposed about the tubing axis with the rolls thereof forming an outer envelope within which the advancing strip is bent and helically curled into tubing, and with the spindles of the roll assemblies extending radially outward and rotatably mounted in fixed frame members, whereby the rolls owing to their eccentric mountings with respect to the spindles individual thereto, automatically align themselves with the path of strip travel at the point of contact of each roll therewith. Thus a true rolling action is assured between the tubing and each caster roll, with complete elimination of any axial sliding or frictional displacement of the tubing along the axial faces of the caster rolls. Any tendency in this direction is automatically corrected by the eccentrically offset, rotative spindle mounting of each caster rolls.

A stationary mandrel preferably extends into the tubing interior, on which may be mounted additional caster rolls in the same fashion as the outer rolls, whereby the inner caster rolls likewise align themselves with the direction of strip travel beneath them at their respective points of contact. The inner caster rolls, of course, cooperate with the outer caster rolls to assist in forming the strip into helically wound tubing as the strip is fed between them.

Once the caster rolls are thus aligned with the path of strip travel at their points of contact, they may be adjustably set in this position, or may even be pre-set in this position, if desired, in accordance with a further feature of the invention.

More particularly, in accordance with the present invention, the outer caster roll and spindle assemblies are mounted in rows on stringer or forming cage bars which extend parallel to the tubing axis between spaced apart upstanding frames, these stringers being angularly spaced, preferably at substantially equal angles about the tubing axis. The caster roll assemblies of each such row are mounted on their associated stringer bar with the spindle housings spaced apart and substantially perpendicular to the tubing axis, and the spindles of each row may be eccentrically ganged together in groups of substantially strip width by connecting bars, so that all caster rolls of each group are forced to assume the same angular positioning with respect to the tubing axis, this positioning being determined by the path of traverse of the tubing beneath the rolls of each group. These connecting bars may also, if desired, be associated with clamping means for clamping in a desired position of adjustment.

The outer caster rolls are thus mounted, form as stated, an envelope of outer rolls within which the entering strip is automatically bent and curled helically into the tubing, and the contiguous edges joined along the seam, as above mentioned. The strip is fed into the tube former through a stationary guide box which provides an edge as well as a top and bottom guiding action sufficient to advance the formed tubing, axially through the tube former. The series of outer caster rolls which the strip first engages substantially tangentially of said envelope, in advancing into the tube former, are preferably disposed at progressively decreasing radial distances from the tube axis, thereby gradually to bend and curl the strip down to the final diameter of the formed tubing.

As above stated, a stationary mandrel preferably extends into said envelope of outer rolls on which are mounted additional caster rolls cooperating with the outer rolls to assist in forming the strip into helically wound tubing. A particularly efficacious arrangement is that in which a row of inner rolls is mounted on the mandrel and disposed in the gap between the first and second rows of outer rolls which the strip first engages as it enters the tube former from the guide box. As the strip is fed between these rows of outer rolls and the inner row of rolls carried by the mandrel, it is bent sufficiently, that it curls easily into helically wound tubular form as it thereafter successively engages the remaining rolls of the outer envelope.

In the case of helically wound welded seam metal tubing of the invention, welding of the tubing along the helical seam is preferably accomplished by means of high frequency fusion heating and mash welding as described in said copending application and also in French Patent 1,172,136, granted October 13, 1958, to Magnetic Heating Corportion. To this end, the apparatus of the invention as adapted to the production of such tubing, includes a high frequency unit having a pair of output leads extending respectively to a pair of contact shoes which slidingly engage the tubing on opposite sides of the seam, respectively, thus to locally heat the metal along the seam to the fusion point, whereupon the seam passes between inner and outer mash rolls mounted on one of the stringer bars and on the mandrel, respectively, which compress the fused metal into welding engagement of substantially the initial thickness of the strip material irrespective of whether a butt weld or a lap weld is imployed.

In accordance with one embodiment of the invention, the stringer bars are adjustably supported at their opposite ends, respectively, by upstanding end frames in such manner as to be individually adjustable both endwise and radially outward or inward with respect to the axis of the tubing. In accordance with another embodiment, all of the stringer bars may be concurrently adjusted in the radial direction aforesaid.

Figure 2:
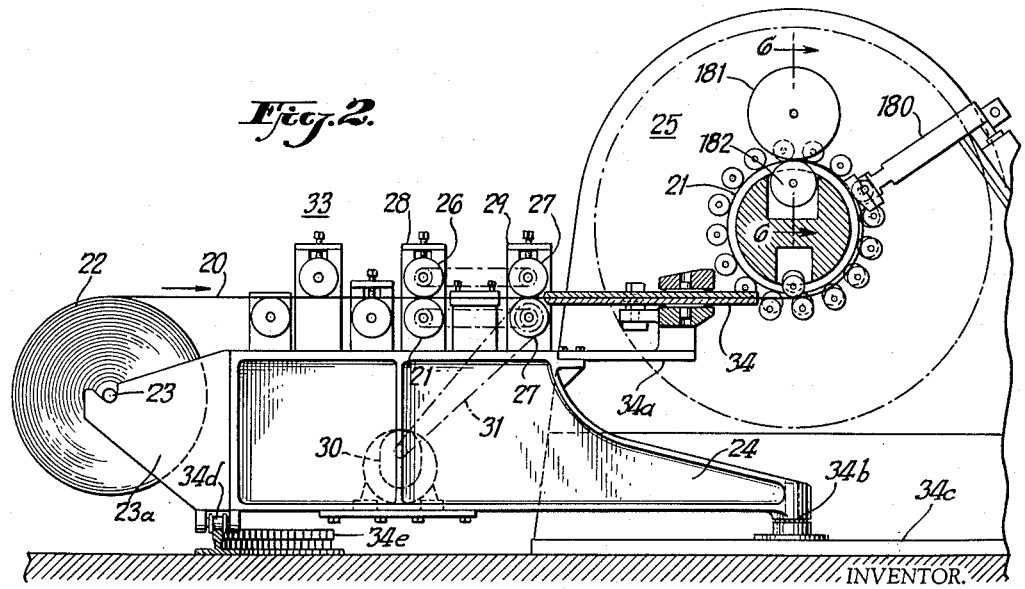

Having thus described the invention in general terms, reference will now be had to the accompanying drawings for a more detailed description of the above and additional features thereof, wherein:

FIG. 1 is a schematic top plan view of one form of apparatus in accordance with the invention in which the stringer bars are individually adjustable endwise and also in the radial direction of the tubing axis as aforesaid. FIGS. 2 and 3 are respectively sectional views taken at 2—2 and 3—3 of FIG. 1. FIG. 4 is a sectional view taken at 4—4 of FIG. 3. FIG. 5 is a sectional view taken at 5—5 of FIG. 1. FIG. 6 is an enlarged sectional view taken at 6—6 of FIG. 2. FIG. 7 is an enlarged sectional view taken at 7—7 of FIG. 6.

FIG. 8 is an enlarged axial sectional view through one of the outer caster roll assemblies and mounting thereof on a stringer, while FIG. 9 is a similar sectional view taken at right angles to that of FIG. 8. FIG. 10 is a fragmentary plan view illustrative of the gang bar mechanism for concurrently aligning a row of caster rolls to the same angular inclination. FIG. 10a is a fragmentary perspective view of a portion of the FIG. 10 showing, and including a means for clamping the gang bar mechanism in a desired position of adjustment. FIG. 10b is a fragmentary showing partly in section of the lower portion of FIG. 8, but as modified to include means for adjusting the caster roll in the radial direction of the tubing.

FIG. 11 is a view in vertical sectional elevation, taken substantially at 11—11 of FIG. 12, and FIG. 12 is a view in end elevation taken substantially at 12—12 of FIG. 11, of a further embodiment of the invention in which the stringer bars may be concurrently adjusted radially inward or outward with respect to the tubing axis. FIG. 13 is an enlarged fragmentary showing in elevation of a portion of FIG. 12, with parts broken away, illustrative of the mechanism for radially adjusting one of the stringer bars as aforesaid. FIG. 14 is a section at 14—14 of FIG. 13. FIG. 15 is a fragmentary sectional view taken at 15—15 of FIG. 13. FIG. 16 is a fragmentary top plan view of a portion of FIG. 14, with a portion broken away to show the internal construction.

Referring to FIGS. 1 and 2, in the embodiment therein shown, the strip 20, to be formed into spirally wound tubing 21, is fed from a coil 22 thereof, rotatively mounted on a shaft 23, supported at its opposite ends in V-notches as shown, in arms 23a of a frame 24. The strip or web 20 is fed from coil 22, to a tube forming unit, shown generally at 25, between successive pairs of power driven pinch or feed rolls 26, 27, journaled in supporting frames 28, 29, mounted on the base frame 24. These rolls are driven by a motor 30, through chains and pinions as at 31, 32, thus to propel the strip into the tube forming unit. Between the reel 22 and the feed rolls 26, are mounted a series of idling rolls, over and under which the strip passes, as at 33, for flattening the strip prior to entry between the feed rolls.

The frame 24 is of the elongated configuration shown in FIGS. 1 and 2, and is pivotally mounted at one end, as at 34b, on the flooring 34c, for rotation about a vertical axis which intersects the horizontal axis of the tubing 21. At its opposite end the frame 24 is supported on a flanged wheel 34d, journaled to the frame as shown and riding upon an arcuate rail 34e, carried by the flooring 34c. The frame 24 may thus be swung about its pivot point 34b, for varying, as desired, the angle at which the strip is fed into the tube former, in relation to the axis of the tubing 21, in the manner illustrated in FIG. 1.

The tube former 25 includes an entry guide box 34 for guiding the strip 20 thereinto. This guide box as shown more in detail in FIGS. 3 and 4, comprises upper and lower plates 36, 37, having centrally welded thereto, respectively, plates 38, 39, integral with studs 40, 40a, rotatively seating in bores as shown in FIG. 3, of a lower frame member 41, FIG. 4, as described hereinafter, and an upper plate 42, which spans the guide box and is bolted at its ends, as at 42a, FIG. 4, to the frame member 41. By virtue of this arrangement the guide box 34 may be rotated about its central pivot point as thus established, thereby precisely to align the same with the direction in which the strip 20 is fed into the tube former 25. For adjustably so setting the guide box 34, a pair of adjusting bolts 44, 45, FIG. 4, are threaded through supporting blocks 46, 47, which are pivotally mounted, as indicated at 49, on ears, as at 50, 51, integral with the frame member 41. Referring to FIG. 3, the lower guide plate 37, is channeled on its upper surface to slightly in excess of the thickness and width of the strip, thus to provide in conjunction with the upper plate 36, a guide box for passage of the strip and which guides the strip along its opposite surfaces and edges, into the tube former at the precise angle determined by the angular positioning of the base frame 24.

Referring more particularly to FIGS. 3–5, inclusive, the tube former proper, comprises a substantially rectangular base frame 60, on the opposite ends of which are respectively mounted, a pair of upstanding end frames 61, 62, centrally apertured, as at 63, 64, for receiving flanged extensions of substantially circular and centrally apertured web members 65, 66, having integral therewith preferably at equi-angularly spaced intervals and at constant radius from the tubing axis, a series of flanged extensions, as at 67, 68 and 69, 70, FIG. 4, for receiving the opposite ends, respectively, of a series of stringer or forming cage bars, as at 41a, and 71–76, inclusive, of FIGS. 3–5, inclusive.

These stringer bars are bifurcated at their ends, in both transverse directions, as at 77, 78, FIG. 4, to provide four parallel prongs, for reception of means for adjusting the stringer bars radially outward or inward with respect to the axis of the tubing and also to permit of endwise adjustment in conjunction therewith. These adjusting means comprise a block 79, which slides between the upper and lower pairs of prongs disposed perpendicular to the plane of the drawing in FIG. 4, and which has oppositely extending therefrom also in the direction perpendicular to the plane of the drawing, a pair of trunnions, as at 80, which extend through blocks, as at 81, which slide, respectively, between the upper and lower pairs of prongs which are parallel to the plane of the drawing. A bolt, as at 81a, is tapped through the block 79, for adjusting the stringer bar in the radial direction. For providing endwise adjustment of the stringer bar, plates are secured to the opposite bifurcated ends thereof, as at 82, 83, which are engaged by the ends of bolts threaded through the frame members 61, 62, as at 84, 85, these bolts being secured in a desired position of adjustment by lock nuts, as at 85a. As these bolts are oppositely adjusted to move the stringer bar to the right or left as desired, blocks 79 and 80 and that beneath the latter (not shown in the drawing), slide in the channels formed between the pronged ends of the stringer bar, thus to permit of this endwise adjustment.

The stringer bars are drilled at spaced intervals, as shown at 88, 89, for bar 41a, FIG. 4, for receiving the spindles of the caster roll assemblies above referred to in the manner shown in detail in FIGS. 8 and 9, wherein bar 41a of FIG. 4 is shown in an enlarged longitudinal and transverse section through hole 88 with a caster roll spindle assembled therein.

Referring to FIGS. 8 and 9, each caster roll assembly comprises, a caster roll 90, journaled to a bearing bolt 91, which extends through the base of a bifurcated bearing support 92, the bolt being held in place as shown in FIG. 9, by its enlarged head 93, at one end, and by the washer, lock nut and cotter pin assembly 94, at the other end. The bearing member 92 is integral with a spindle 95 which extends through bore 88 of the stringer bar 41a, being journaled therein by the upper and lower ball bearing assemblies 96, 97, and the entire assembly being secured by the nut 99 tapped into a countersunk enlarged bore in the upper face of bar 41a as shown. Referring to FIG. 9, it will be seen that the bearing member 92 is canted away from the axis of the spindle 95, so that roll 90 is journaled thereto eccentrically with respect to the spindle axis, whereby the caster roll and spindle assembly will be rotated by the tubing 21 to an angular position such that the roll 90 will be automatically aligned with the path of travel of the tubing 21 at its point of contact 100 with roll 90.

Referring to FIGS. 8–10, inclusive, the spindle 95 projects at reduced diameter above the stringer bar 41a as shown, and is squared near its upper end as at 101, but is round and threaded at its uppermost tip 101a. A lever arm member 102, has a sleeved portion 103, which is sleeved over the upper end of the spindle 95 as shown, and which is of square configuration at its upper end for reception of the squared upper portion 101 of the spindle, thus to prevent rotative movement between the spindle and lever arm. A nut 104 is threaded onto the upper threaded end 101a of the spindle for securing the lever arm thereto.

FIG. 10 illustrates at 105–107, inclusive, the relative positioning of three adjacent caster roll assemblies of the stringer bar 41a, each of these assemblies being identical with that of FIGS. 8 and 9. The lever arms 108–110, inclusive of these assemblies are ganged together by means of a bar 111, which is drilled as at 113–115, inclusive, at spacings corresponding to the spindle spacings of the caster assemblies 105–107, inclusive, and which is pivotally secured to the drilled outer ends of their respective lever arms by means of pins, as at 116, FIG. 10, extending therethrough as shown, these pins being secured by cotter pins, as at 117, FIG. 10. As the result of this arrangement the caster rolls of all the assemblies 105–107 will be concurrently adjusted to the same angular relationship with respect to the surface of the tubing 21. A sufficient number of caster rolls carried by each of the respective stringer bars are ganged together in the manner shown in FIG. 10, to span the biased width of the strip being formed into tubing, usually about seven such rolls.

Referring to FIGS. 10 and 10a, the ganging bar 111, may be adjustably clamped in any desired position of alignment of the associated caster rolls, by means of a clamp 118, secured to the upper face of the stringer bar 41a, by means of bolts, as at 118a. The clamp 118 has a bifurcated portion 119, through which one end of bar 111 extends as shown, and the upper arm of the bifurcated portion 119 of the clamp, has tapped therethrough a clamping bolt 120 for clamping the bar 111 in a desired position of alignment of the associated caster rolls, as above stated.

Referring to FIGS. 8 and 10b, the caster roll 90, may be adjusted radially with respect to the axis of the tubing, by means of one or more shims, as at 90a, interposed on the spindle 95 between the bearing member 92 and the bearing 97, as shown by comparison of FIGS. 8 and 10b. A correspondingly longer spindle 95 is in general required for the shimed caster roll.

Reverting to FIGS. 3–5, inclusive, each of the successive stringer bars carries a row of caster rolls extending over a length of substantially double the strip width taken at the angle of inclination at which the strip passes under them, and these rolls on each stringer are preferably ganged together into two groups as at 121, 122, for stringer 71; 124, 125 for stringer 73; and 126, 127 for stringer 72, since the strip in bending and curling along its helical path, against the successive groups of rolls, first engages the roll groups 124, 121 and 126 successively and then the roll groups 125, 122 and 127 successively, as the strip is helically wound on its first and second revolutions. It will further be observed that these roll groups are axially displaced along their stringers in the order above stated in conformity with the helical path followed by the strip. This is best seen at 128 of FIG. 1, and also in FIG. 5, wherein the strip successively engages the roll groups shown in this figure in the order of 124, 126, 125 and 127.

The action of the roll groups in bending and curling the strip into helical tubing is best explained by referring first to FIG. 3, wherein it will be seen that the rows of caster rolls on the stringer bars such as 73, 41, 72–76, inclusive, and 71 together with those of the unnumbered intervening stringer bars in the direction of strip feed, form an outer envelope of rolls, within which the strip is guided, bent and curled as it emerges from the guide box 34, first upwardly and thence over and downwardly and thence under and upwardly again into the ultimate tubular configuration shown at 21.

At the same time the strip is thus being bent and curled, it is also being axially displaced in the manner illustrated in FIGS. 1, 4 and 5, by virtue of the guiding action of the guide box 34 which feeds the strip into the tube former at an oblique angle to the tubing axis as shown in FIGS. 1 and 4.

Referring particularly to FIGS. 3 and 4, in order to facilitate the initial bending and curling of the strip as it passes out of the guide box 34, the roll groups which the strip initially encounters are disposed at progressively decreasing radial distances from the tubing axis, as is most clearly seen in FIG. 3, and by employment of shims as shown in FIG. 10b, commencing with roll group 124 on stringer 73, and proceeding thence through roll group 121 on stringer 41 to that of roll group 126 on stringer 72, the succeeding roll groups being disposed at constant radial distances from the tubing axis in conformity with the final diameter in which the tubing is formed.

Referring to FIGS. 3 and 5, the initial upward curling of the strip as it emerges from the guide box 34, is facilitated by the provision of a row of rolls which engage the strip on the opposite or interior side of the tubing being formed, as at 127a. To provide a mounting for these rolls, a mandrel 127b, FIGS. 1–5, inclusive extends from an upright support 128, at the left, thence through the central aperture of the web and end frame assembly 65, 61, for further support, and axially thence for a short distance into the interior of tubing 21 being formed. The mandrel is transversely slotted, as at 123a, 129, FIG. 5, and drilled through at equispaced intervals, as at 130, for rotatively mounting therein, the spindles, as at 131, of a series of caster rolls 132. The spindles are rotatably secured to the mandrel by means of snap rings, as at 131a, which may be snapped into any of a series of axially spaced circular grooves on each spindle, as at 131b, to permit of individually adjusting the caster rolls radially of the tubing axis by means of shims interposed on the caster roll spindles as in 90a, FIG. 10b.

As shown in FIG. 3, the inner row of rolls 127a, is disposed in the space between the first two rows of outer rolls 124, 124a, that the strip 20 engages in passing from the guide box 34 into the tube former. As the strip is fed between the inner row of rolls 127a and the outer rows of rolls 124, 124a, it is given an initial and rather sharp bend, which causes it to curl easily into helically wound tubular form, requiring very little additional forming by the remaining rows of rolls of the outer envelope, which may thus, in some instances, be replaced by fixed guides or by guides mounting ball bearings engaging the strip at widely spaced intervals.

Reverting to FIGS. 3–5, inclusive, when the entering strip, assuming it to be metal strip, has reached the point where it is coiled to the ultimate tubing diameter, it may be welded along its edge to the edge of the previously formed tubing by means of a high frequency heating unit 180, FIG. 3, and cooperating exterior and interior mash rolls 181, 182.

The high frequency heating unit 180 is preferably of the type described in the aforesaid co-pending application and also in the French Patent No. 1,172,136 above referred to, and hence requires no detailed description herein. In essence, it comprises a source of high frequency electrical energy, on the order of about 400,000 c.p.s. supplied to a pair of spaced contact shoes, one of which is shown at 133, FIG. 3, with the other in spaced alignment therewith (i.e., beneath shoe 133 in FIG. 3), which shoes ride upon the contiguous strip edges to be joined whereby these edges are locally heated to fusion, the thus fused edges passing thence between the mash rolls 181, 182, to effect fusion welding. Either a butt or lap weld may be employed.

If the tubing is formed of plastic material, the high frequency unit 180 will, of course, be omitted or not energized, and the mash rolls 181, 182, will be heated by any conventional means, for joining the contiguous strip edges by heat sealing pressure.

As shown in FIG. 3, the high frequency unit 180 is mounted on a bracket 135, secured to one of the stringers 136. As shown in FIGS. 6 and 7, the outer mash roll 181, is journaled, as at 137, to a split bearing member 138, for rotation about a substantially horizontal axis, while the bearing member 138, is in turn, journaled as at 139, to a fixed supporting member 140, for rotation about a substantially vertical axis. To this end member 138 sleeves at its upper end onto a vertical spindle 141, being keyed thereto by a countersunk screw 142. The spindle is journaled as at 143, within a bore of support 140, for rotation therein. As shown in FIGS. 3 and 5, the upper end of the spindle 141 projects above the support 140, and has threaded thereon, a pair of nuts 144, 145, the first screwed down to a point leaving sufficient play for the spindle to rotate freely and the second screwed into tight engagement with the first.

As is also shown in FIGS. 3 and 5, the support 140, extends through a bore of a plate 146, being welded thereto. This plate is drilled at its opposite ends for reception of upstanding threaded bolts 147, 148, integral with blocks 149, 150, welded to right and left hand portions of stringer 72, which has a section cut out, as at 151, to provide space therebetween for the mash roll. Plate 146 is mounted as shown on the bolts 147, 148, between upper and lower nuts threaded thereon as at 153, 154, thus to provide for vertical adjustment of the plate 146 and mash roll assembly. This plate also serves rigidly to join the two stringer sections together.

Reverting to FIG. 7, it will be noted that the bearing member 138 slants away from the axis of spindle 141, so that the axis of roll 181 is eccentric with respect to the spindle axis, to provide the caster roll action above discussed, whereby the mash roll is automatically aligned with the path of strip travel beneath it.

The inner mash roll 182, is mounted as shown in FIG. 5, in a slotted recess 160, FIG. 5, of the mandrel 127, and in the manner shown in FIGS. 6 and 7. As therein shown, roll 182 is journaled, as at 161, to a caster type bearing member 162, for rotation about a horizontal axis. Member 162 is keyed, as at 163, to a vertical spindle 164, FIGS. 5 and 6, journaled, as at 165, in a bore of the mandrel as shown, in addition to which the member 162 rests on a thrust bearing 166, supported on the mandrel at the base of the recess 160 as shown, whereby member 162 is rotatable about a vertical axis. By virtue of this mounting the inner mash roll 182 also automatically aligns itself with the direction of strip travel at the point of contact. Referring to FIG. 5, the spindle 164 is rotatably secured to the mandrel 127b, by a snap ring 164a, which may be snapped into any of the axially spaced circular grooves on the spindle, as at 164b, to permit adjustment of the inner mash roll radially with respect to the axis of the tubing 21, by means of shims interposed on the spindle between the thrust bearing 166 and the base of the mandrel recess 160.

For welding metal tubing, the mash rolls may be cooled in any conventional manner as by an air blast or may be arranged with internal conduits for circulation of a coolant supplied over flexible hose lines. For heat sealing plastic tubing, mash rolls may be employed which are heated in a conventional way as by induction heating from an alternating current source of suitable frequency, etc.

Turning now to the embodiment of the invention shown in FIGS. 11–16, inclusive, and referring for the moment to FIGS. 11 and 12, a series of stringer bars, as at 200–202, inclusive, are angularly disposed, preferably at equal angles and at substantially constant radius about the axis of the tubing 21 being produced. Mounted on each stringer bar, is a row of caster rolls, as at 200a, 200b, FIG. 11, these rolls being rotatably mounted by their spindles, as at 200c, FIG. 12, in bearing members, as at 200d, carried by the stringer bars, as shown in FIGS. 11 and 12. As shown in FIG. 12, the successive rows of caster rolls, as at 200a–202a, inclusive, carried by the successive stringer bars, as at 200–202, form in aggregate an envelope of rolls, conforming to the outer contour of the tubing 21 being produced, with the caster roll spindles of the successive rows disposed substantially along radial lines centering on the tubing axis.

Referring now to all of FIGS. 11–16, inclusive, for an explanation as to the construction and operation of the mechanism for concurrently adjusting all of the stringer bars radially inward or outward to the same extent, each stringer bar, such as bar 200, is secured at its opposite ends, respectively, as by means of an angle member 203, to a slide block, as at 204, slidably mounted between a pair of guides, as at 205, 206, these guides being bolted, as at 207, 208, to an end frame, as at 62, corresponding to the end frame 62, of FIG. 5, the opposite end frame, not shown in FIGS. 11–15, inclusive, corresponding to end frame 61 of FIG. 5. FIG. 15 illustrates at 209, the manner in which the slide block 204, and its guides, such as at 206, are longitudinally channeled and shouldered in complementary fashion, to retain the slide block in place while permitting longitudinal displacement thereof with respect to the guides.

Referring to FIG. 12, it will be seen that each pair of guides mounting any given slide block are disposed parallel to a line extending radially from the axis of the tubing 21, as at 205, 206–205b, 206b, inclusive, etc., so that the slide blocks mounted therebetween, respectively, as at 204–204b, inclusive, etc., move radially outward or inward with respect to the tubing axis, when displaced along their associated guides, and thus correspondingly displace the stringer bars carried thereby, as at 200–202, inclusive, etc., and likewise the caster rolls mounted thereon, respectively, as at 200a–202a, inclusive, etc.

Referring more particularly to FIGS. 14–16, each slide block as at 204, is transversely and centrally slotted longitudinally over an intermediate portion, as at 210, and above this is centrally and longitudinally drilled and tapped, for reception of the threaded lower portion 211, of a spindle 212, the upper unthreaded portion of which is journaled through bearings, as at 213, 214, to a housing, as at 215, mounted upon a flanged ring member 216, bolted to the frame 62, as at 217, FIG. 14.

On the upper end of the spindle 212, is mounted a worm gear 218, keyed to the spindle, and which meshes with a worm 219, keyed onto a shaft 220, journaled through bearings, as at 221, 222, to the housing 215. One end of the shaft 220 projects beyond the housing, as at 220a, FIG. 14, and has mounted thereon and keyed thereto, a pinion 223, which meshes with an internally toothed ring gear 224, disposed concentric with the axis of the tubing 21, as shown in FIG. 12, and of a diameter such as therein shown, as to encircle and mesh with the pinions, corresponding to 223, FIG. 14, individual to the successive slide blocks such as the pinions 223, 223a, 223b, etc., for slide blocks 204, 204a, 204b, etc., respectively.

It will thus be seen that rotation of ring gear 224 will in turn concurrently rotate all of the pinions 223, 223a, 223b, etc., and thereby radially displace the associated slide blocks 204, 204a, 204b, etc., inward or outward, to an extent dependent on the direction and extent of rotation of the rack. Thus referring to FIGS. 13 and 14, if gear 224 is rotated clockwise in FIG. 12, pinion 223 will be similarly rotated and with it the worm 219, which in turn will similarly rotate pinion 218 and spindle 212, keyed thereto, and thereby raise the slide block 204, owing to the threaded engagement of the lower end 211 of the spindle with the slide block. Reversal of the direction of rotation of ring gear 224 will of course cause the slide block 204 to be lowered. In either case the extent of displacement of the slide block will be determined by the extent of rotation of the ring gear.

Hence rotation of the ring gear clockwise or counter-clockwise, causes all of the slide blocks to be concurrently raised or lowered to the same extent, and thereby adjust the diameter of the envelope of caster rolls, FIG. 12, in accordance with a desired diameter of the tubing 21 being produced.

The ring gear 224 is of course rotatively supported concentric with the tubing axis by the series of pinions 223, 223a, 223b, etc., which it encircles and meshes with. It is additionally guided and supported by a series of idler rolls 230, 230a, 230b, etc., disposed about and contacting the outer face of the ring gear 224 as shown in FIG. 12. These idler rolls are journaled to upstanding support members, as at 231, 231a, 231b, etc., bolted as at 232, FIG. 13, to the flanged ring 216, carried by the end frame 62.

For rotating the gear 224, a reversible motor 233, FIG. 11, mounted as at 234, on the end frame 62, drives through reduction gearing 235, a shaft 236, coupled, as at 237, to the shaft of one of the pinions, such as shaft 220 for pinion 223, this shaft being extended for this purpose beyond the pinion, as shown in 220a, FIG. 14.

The ring gear 224 may be replaced by a chain encircling and meshing with the pinions 223, 223a, 223b, etc., this chain also encircling a motor driven sprocket for driving the same.

In the appended claims by the expression "caster roll" is meant a roll journaled to a bearing member having integral therewith, a spindle disposed at right angles to the axis of rotation of said roll and offset with respect thereto.

What is claimed is:

1. Apparatus for forming metal strip into tubing, comprising: a pair of spaced apart, upstanding frames, a plurality of stringer bars, angularly disposed at substantially constant radius about a common axis, said bars extending between said frames and being adjustably secured thereto by means for radial and means for endwise adjustment, a row of outer caster rolls, a radially extending spindle supporting each roll and being offset from the axis thereof, said spindles being rotatably mounted in spaced relation along each said stringer bar, with the rolls thereof projecting toward said common axis, whereby said rolls in aggregate form an envelope of a substantially cylindrical surface, a mandrel carried by a fixed support extending coaxially within said envelope of outer rolls, at least one row of inner caster rolls with the rolls thereof disposed between successive rows of outer rolls, a radially extending spindle supporting each inner roll and being offset from the axis thereof, said inner spindles being mounted for pivotal movement in said mandrel, means for continuously feeding and guiding said strip at an oblique angle to said axis between said outer and inner rolls, whereby said strip is progressively bent and curled along a substantially helical path and into tubular form by the successive rows of rolls, and whereby all of said rolls are automatically swung by contact with said strip about their rotatably mounted spindles into alignment with the path of travel of said strip at its points of contact with said rolls, respectively, and means for continuously welding contiguous edges of said strip to form said tubing, said welding means comprising a high frequency electrical energy source connected to contact shoes engaging said edges, respectively, for fusion heating the same, and a pair of caster mash rolls mounted respectively on the interior and exterior of said tubing adjacent said contact shoes for compression welding said fused edges together, thereby to form said tubing.

2. Apparatus for forming flexible strip material into tubing, comprising: a pair of spaced apart, upstanding frames, a plurality of stringer bars, angularly disposed at substantially constant radius about a common axis, said bars extending between said frames and being secured thereto, a row of caster rolls, a spindle supporting each such roll and being offset from the axis thereof, said spindles being rotatably mounted in equi-spaced relation on each said stringer bar, with the rolls thereof projecting toward said common axis, said rows of caster rolls being progressively and longitudinally disposed along successive stringer bars to form in aggregate a substantially helical surface of substantially double the strip width, means for feeding and guiding said strip at an oblique angle to said axis conforming to the angle of inclination of said helical surface therewith and substantially tangentially to said cylindrical surface, against a first row of said rolls, whereby said strip is progressively bent and curled by said envelope of rolls along said helical surface, and whereby said rolls are automatically swung by contact with said strip about their rotatably mounted spindles into alignment with the path of travel of said strip at its points of contact with said rolls, respectively, means eccentrically ganging together the roll spindles on each stringer bar into groups each of substantially strip width, whereby the rolls of each ganged group are concurrently swung by contact with said strip, into alignment with the path of strip travel, and means for continuously joining contiguous edges of said strip to form said tubing.

3. Apparatus for forming flexible strip material into tubing, comprising: a pair of spaced apart, upstanding frames, a plurality of stringer bars, angularly disposed at substantially constant radius about a common axis, said stringer bars extending between said frames and being adjustably secured thereto by a means providing for both endwise and radial adjustments thereof, a row of caster rolls, a spindle supporting each such roll and being offset from the axis thereof, said spindles being rotatably mounted by their spindles at spaced intervals along each said stringer bar, with the rolls thereof projecting toward said common axis, whereby said rolls in aggregate form an envelope of a substantially cylindrical surface, and means for feeding and guiding said strip at an oblique angle to said axis, in substantially tangential relation to said cylindrical surface, and against a first row of said rolls, whereby said strip is progressively bent and curled by said envelope of rolls along a helical path, and whereby said rolls are automatically swung by contact with said strip, about their rotatably mounted spindles, into alignment with the path of travel of said strip at its points of contact with said rolls, respectively, means for clamping the spindles of said rolls in position, and means for continuously joining contiguous edges of said strip to form said tubing.

4. Apparatus for forming metal strip into tubing, comprising: a plurality of caster rolls, a spindle supporting each such roll and being offset from the axis thereof, said spindles being supported in means rotatively mounting the same in successive rows, angularly spaced about a common axis and with the rolls thereof in aggregate enveloping a substantially cylindrical surface about said axis, means for continuously feeding and guiding said strip at an oblique angle to said axis against a first row of said rolls and substantially tangential thereto in the direction of the next succeeding row of said rolls, whereby said strip is progressively bent and curled along a substantially helical path and into tubular form by the successive rows of rolls, means eccentrically ganging the roll spindles into groups in each row whereby all rolls of each group may be concurrently swung into a preselected angular position, means for adjustably clamping such gang means in such position, and means for continuously joining the so wound strip along contiguous edges thereof to form said tubing.

5. In a tube forming apparatus in combination: a pair of spaced apart, upstanding frames, a plurality of roll supporting stringer bars angularly disposed about a common axis and extending between said frames, means adjustably securing the opposite ends of said stringer bars to said frames, respectively, for radial adjustment with respect to said axis, said means comprising for each end of each stringer bar, a pair of parallel guides extending radially of said axis, a slide block slidably disposed between said guides, and means for concurrently adjusting all of said slide blocks, said means including spindles tapped radially of said axis into said slide blocks, respectively, and means including pinions disposed at substantially constant radius about said axis for rotating said spindles, and means encircling said pinions and meshing therewith for concurrent rotation thereof.

6. In an apparatus for forming flexible strip material into helically wound tubing, the combination comprising: a plurality of forming rolls, each journaled to a bearing member integral with a spindle normal to the roll axis and offset with respect thereto, means mounting said rolls for rotation about said spindles in rows parallel to the axis of said tubing, said rows comprising a row of inner rolls disposed in staggered relation between a pair of rows of outer rolls, means for feeding said strip at an oblique angle to said axis between said inner and outer rows of rolls, and with said rolls inclined substantially in alignment with the path of travel of said strip, means for so adjusting the spacing between said rows of rolls in relation to the thickness of said strip, as to bend and curl the same along a helical path, additional means for thereafter guiding and forming said strip to the precise diameter of said tubing, and means for uniting contiguous edges of said strip to complete the formation of said tubing.

7. In an apparatus for forming flexible strip material into helically wound tubing, the combination comprising: a plurality of forming rolls, each journaled to a bearing member integral with a spindle normal to the roll axis and offset with respect thereto, means mounting said rolls for rotation about said spindles in rows parallel to the axis of said tubing, said rows comprising a row of inner rolls disposed in staggered relation between a pair of rows of outer rolls, means for feeding and strip at an oblique angle to said axis between said inner and outer rows of rolls and with said rolls inclined substantially in alignment with the path of travel of said strip, means for so adjusting the spacing between said rows of rolls in relation to the thickness of said strip, as to bend and curl the same along a helical path, additional means thereafter engaging the strip in rolling contact therewith in the direction of strip travel, for forming the same to the precise diameter of said tubing, and means for uniting contiguous edges of said strip to complete the formation of said tubing.

8. Apparatus for forming flexible strip material into tubing, comprising: a plurality of outer rolls disposed relatively to one another to form in aggregate a substantially cylindrical envelope about a common axis, a plurality of inner rolls, a radially extending spindle supporting each such roll and offset relatively to its respective roll axis, support means mounting said spindles for pivotal movement about their respective axes, means for continuously feeding and guiding strip material into the envelope formed by said rolls at an oblique angle to said common axis, whereby said strip is progressively curled and bent by said envelope along a helical path tangential to said envelope and said rolls are automatically swung by contact with said strip about their respective spindle axes into alignment with the path of travel of said strip, means for continuously joining contiguous edges of the so wound strip to form said tubing, interior and exterior mash rolls for compressing said contiguous edges, radially extending spindles supporting said mash rolls, and support means mounting said spindles for pivotal movement about their respective axes.

References Cited in the file of this patent

UNITED STATES PATENTS

| | | |
|---|---|---|
| 713,767 | Judge | Nov. 18, 1902 |
| 725,723 | Kirk | Apr. 21, 1903 |
| 1,070,268 | Lawton | Aug. 12, 1913 |
| 1,583,212 | Williams | May 4, 1926 |
| 1,659,792 | Thorsby | Feb. 21, 1928 |
| 1,713,803 | Whiton | May 21, 1929 |
| 1,739,774 | Thorsby | Dec. 17, 1929 |
| 1,774,000 | Hand | Aug. 26, 1930 |
| 1,884,658 | Gladkov et al. | Oct. 25, 1932 |
| 2,059,578 | Henning | Nov. 3, 1936 |
| 2,873,353 | Rudd | Feb. 10, 1959 |
| 2,883,201 | Goodrum | Apr. 21, 1959 |

FOREIGN PATENTS

| | | |
|---|---|---|
| 264,620 | Great Britain | Jan. 27, 1927 |